US006861813B2

United States Patent
Yoshimoto et al.

(10) Patent No.: US 6,861,813 B2
(45) Date of Patent: Mar. 1, 2005

(54) MOTOR CONTROL APPARATUS AND MOTOR CONTROL METHOD

(75) Inventors: Kantaro Yoshimoto, Yokohama (JP); Yasuhiko Kitajima, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 171 days.

(21) Appl. No.: 10/286,765

(22) Filed: Nov. 4, 2002

(65) Prior Publication Data

US 2003/0090231 A1 May 15, 2003

(30) Foreign Application Priority Data

Nov. 15, 2001 (JP) ........................................ 2001-350156

(51) Int. Cl.[7] ................................................. H02P 6/00
(52) U.S. Cl. ......................... 318/432; 318/721; 318/722
(58) Field of Search ............................... 318/432, 433, 318/138, 254, 439, 720, 721, 722

(56) References Cited

U.S. PATENT DOCUMENTS

| 4,808,903 A | * | 2/1989 | Matsui et al. | ............... 318/800 |
|---|---|---|---|---|
| 4,958,117 A | * | 9/1990 | Kerkman et al. | ........... 318/805 |
| 5,047,909 A | * | 9/1991 | Hosoda | ....................... 363/40 |
| 5,140,248 A | * | 8/1992 | Rowan et al. | ............... 318/811 |
| 5,235,503 A | * | 8/1993 | Stemmler et al. | ............. 363/37 |

FOREIGN PATENT DOCUMENTS

| EP | 1 211 798 A2 | 6/2002 |
|---|---|---|
| JP | 03-118769 | 5/1991 |
| JP | 09-028099 | 1/1997 |
| JP | 2000-092899 A | 3/2000 |
| JP | P2000-356117 | 11/2000 |
| JP | P2002-223600 | 8/2002 |

* cited by examiner

*Primary Examiner*—Bentsu Ro
(74) *Attorney, Agent, or Firm*—McDermott Will & Emery LLP (57) ABSTRACT

Limits are imposed on a fundamental voltage command value calculated at a fundamental current control circuit that controls a fundamental component of a 3-phase AC motor current in a dq-axis coordinate system rotating in synchronization with the rotation of the 3-phase AC motor by using predetermined limit values and limits are imposed on a higher harmonic voltage command value calculated in an orthogonal coordinate system (a higher harmonic coordinate system) rotating at a frequency set to an integral multiple of the frequency of the fundamental component in the 3-phase AC motor current by using a predetermined limit values. The voltage command values resulting from the limit processing are added together and a voltage corresponding to the sum is applied to the AC motor for drive control.

13 Claims, 5 Drawing Sheets

FUNDAMENTAL LIMITER

FIG.3

HIGHER HARMONIC LIMITER

MOTOR CONTROL APPARATUS AND MOTOR CONTROL METHOD

BACKGROUND OF THE INVENTION

1. Field of the Invention

The present invention relates to a motor control apparatus and a motor control method and, more specifically, it relates to a technology whereby a higher harmonic current flowing through a 3-phase AC motor is reduced.

2. Description of the Related Art

The applicant of the present invention proposed a motor control apparatus that reduces a higher harmonic current flowing through a 3-phase AC motor in Japanese Patent Application No. 2000-356117. The motor control apparatus, which includes a fundamental current control circuit that controls a fundamental current in a dq-axis coordinate system rotating in synchronization with the motor rotation and a higher harmonic current control circuit that controls a higher harmonic current in a dhqh coordinate system rotating at a frequency set to an integral multiple of the frequency of the fundamental current, controls a current flowing to the 3-phase AC motor. The fundamental current control circuit calculates a d-axis voltage command value and a q-axis voltage command value to be used to match the actual d-axis current and q-axis current with their command values, whereas the higher harmonic current control circuit calculates a dh-axis voltage command value and a qh-axis voltage command value to be used to match the actual dh-axis current and qh-axis current with their command values. Then, the d-axis and q-axis voltage command values and the dh-axis and qh-axis voltage command values are added together to convert them to 3-phase AC voltage command values, and the AC voltages thus determined are applied to the 3-phase AC motor through an invertor.

SUMMARY OF THE INVENTION

However, factors such as the level of the source voltage and the output limit at the invertor set upper and lower limits on the level of a voltage that can be applied to the motor, and the 3-phase AC voltage command value calculated through the current control circuits described above may be higher or lower than the invertor output voltage. In such a case, it is not possible to converge the actual currents to the command values at the fundamental current control circuit and the higher harmonic current control circuit. If the control implemented by the current control circuits includes integral control in this situation, the deviations of the actual currents relative to the command values, i.e., the current control errors, are continuously integrated, which greatly reduces the response of the current control systems.

An object of the present invention is to improve the response of a current control circuit that controls an AC motor current when the AC voltage command value output from the current control circuit is higher than or lower than the upper or lower limit of the invertor output voltage.

The motor control apparatus according to the present invention comprises a current component detection device that detects a plurality of components contained in an AC motor current which are different from one another, a plurality of current control devices each provided in correspondence to one of the components in the AC motor current to implement at least integral control on a deviation of a detected current value corresponding to the component detected by the current component detection device relative to a current command value corresponding to the component and to calculate a command value for an AC voltage corresponding to the component to be applied to the AC motor, a plurality of voltage limit devices each provided in correspondence to one of the current control devices to limits the voltage command value calculated by the corresponding current control device to each of the predetermined limit values and a power conversion device that calculates a sum of outputs from the plurality of voltage limit devices and applies a voltage corresponding to the sum to the AC motor.

The motor control apparatus according to the present invention comprises a current detector that detects a fundamental component and a higher harmonic component contained in a 3-phase AC motor current, a fundamental current control circuit that controls the fundamental component in the 3-phase AC motor current in a dq-axis coordinate system rotating in synchronization with the rotation of the 3-phase AC motor, which calculates a command value for a fundamental voltage to be applied to the 3-phase AC motor by implementing at least integral control on a deviation of a detected current value corresponding to the fundamental component detected by the current detector relative to a current command value corresponding to the fundamental component, a higher harmonic current control circuit that controls the higher harmonic component in the 3-phase AC motor current in an orthogonal coordinate system rotating at a frequency set to an integral multiple of a frequency of the fundamental component in the 3-phase AC motor current, which calculates a command value for a higher harmonic voltage to be applied to the 3-phase AC motor by implementing at least integral control on a deviation of a detected current value corresponding to the higher harmonic component detected by the current detector relative to a current command value corresponding to the higher harmonic component, a fundamental voltage limiter that limits the fundamental voltage command value to each of predetermined limit values, a higher harmonic voltage limiter that limits the higher harmonic voltage command value to each of predetermined limit values and a power converter that calculates a sum of the outputs from the fundamental voltage limiter and the higher harmonic voltage limiter and applies a voltage corresponding to the sum to the AC motor.

The motor control method according to the present invention comprises detecting a plurality of components contained in an AC motor current that are different from one another, calculating AC voltage command values each corresponding to one of the components to be applied to the AC motor by implementing at least integral control on a deviation of a detected current value corresponding to the component relative to a current command value corresponding to the component, limiting the voltage command values each calculated in correspondence to one of the components to each of the predetermined limit values and applying a voltage corresponding to a value representing a sum of the voltage command values having undergone limit processing to the AC motor.

DETAILED DESCRIPTION OF THE PREFERRED EMBODIMENTS

First Embodiment

Figure 1:
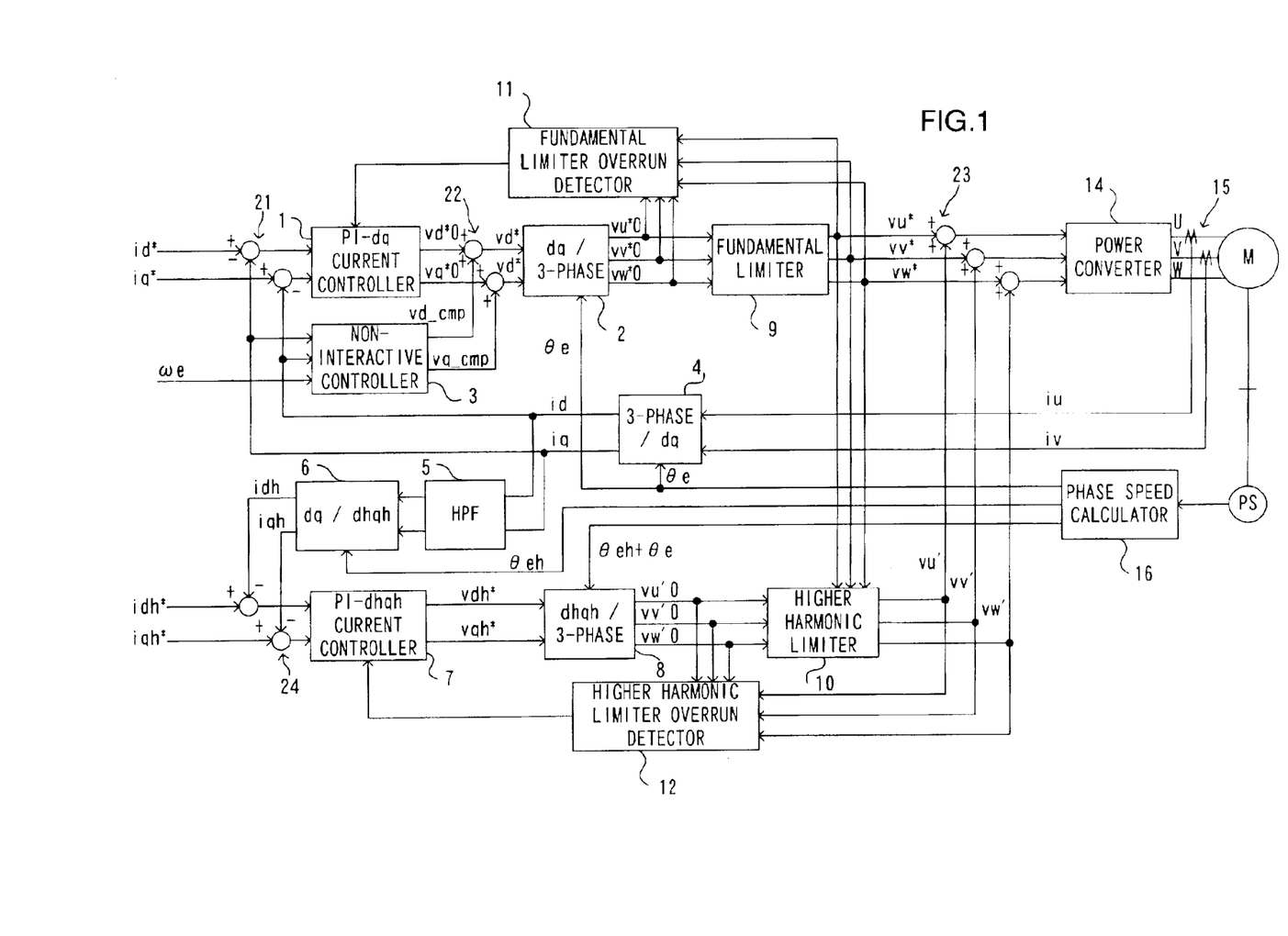
FIG. 1 shows the structure adopted in a first embodiment of the motor control apparatus according to the present invention.

FIG. 1 is a control block diagram showing the structure of the motor control apparatus achieved in the first embodiment. The motor control apparatus in the first embodiment includes a fundamental current control circuit and a higher harmonic current control circuit. The fundamental current control circuit controls the fundamental components in motor currents iu, iv and iw in a dq-axis coordinate system which rotates in synchronization with the motor rotation. The higher harmonic current control circuit controls the higher harmonic components contained in the motor currents iu, iv and iw in an orthogonal coordinate system (hereafter referred to as a higher harmonic coordinate system or a dhqh-axis coordinate system) which rotates with the frequency of a higher harmonic component of a predetermined order manifesting when the motor currents iu, iv and iw are controlled through the fundamental current control circuit alone. In other words, the dhqh-axis coordinate system is a higher harmonic coordinate system that rotates with a frequency set to an integral multiple of the frequency of the fundamental components in the motor currents iu, iv and iw.

The fundamental current control circuit is provided with a PI-dq current controller 1, a dq/3-phase converter 2, a non-interactive controller 3, a 3-phase/dq converter 4, a fundamental limiter 9 and a fundamental limiter overrun detector 11. The PI-dq current controller 1 implements individual PI (proportional integral) control on the deviations of actual currents id and iq relative to a d-axis current command value id* and a q-axis current command value iq* calculated by a subtractor 21 and calculates a d-axis fundamental voltage command value vd*0 and a q-axis fundamental voltage command value vq*0 to be used to match the actual currents id and iq with the current command values id* and iq*. The non-interactive controller 3 calculates a d-axis compensating voltage vd_cmp and a q-axis compensating voltage vq_cmp to be used to improve the response of the d-axis current and the q-axis current by compensating the speed electromotive forces present along the d-axis and the q-axis. An adder 22 calculates voltage command values vd* and vq* by adding the d-axis compensating voltage vd_cmp and the q-axis compensating voltage vq_cmp to the outputs vd*0 and vq*0 from the PI-dq current controller 1.

The dq/3-phase converter 2 executes a coordinate transformation to convert the d-axis voltage command value vd* and the q-axis voltage command value vq* to 3-phase AC voltage command values (fundamental component) vu*0, vv*0 and vw*0 based upon a phase θe of the fundamental current coordinate system (the dq-axis coordinate system) viewed from a 3-phase AC coordinate system. The 3-phase/dq converter 4 executes a coordinate transformation to convert the 3-phase currents iu, iv and iw (=−iu−iv) detected by a current sensor 15 to the d-axis actual current id and the q-axis actual current iq based upon the phase θe.

The fundamental limiter 9 performs limit processing on the 3-phase AC voltage command values (fundamental component) vu*0, vv*0 and vw*0 so as to set the voltages output from a power converter 14 within upper and lower limits determined in conformance to the level of the source voltage and the output limits. The 3-phase AC voltage command values (fundamental component) vu*, vv* and vw* having undergone the limit processing are output to the power converter 14.

Figure 2:
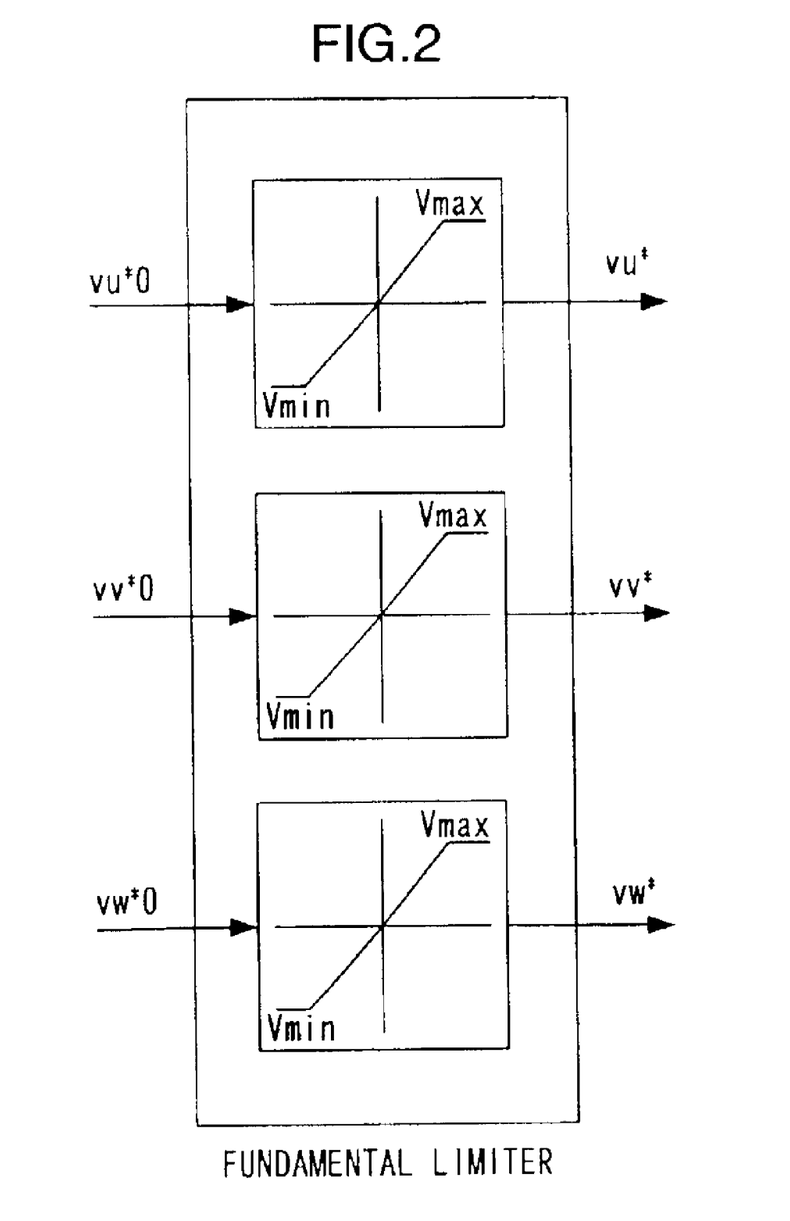
FIG. 2 shows the structure adopted in the fundamental limiter.

FIG. 2 shows the operation of the fundamental limiter 9. If the U-phase fundamental voltage command value vu*0 exceeds the upper limit value Vmax equivalent to the upper limit to the voltage that can be output from the power converter 14, the U-phase fundamental voltage command value vu*=Vmax is output. If, on the other hand, the U-phase fundamental voltage command value vu*0 is lower than the lower limit value Vmin equivalent to the lower limit to the voltage output from the power converter 14, the U-phase fundamental voltage command value vu*=Vmin is output. If the U-phase fundamental voltage command value vu*0 is equal to or lower than the upper limit value Vmax and equal to or higher than the lower limit value Vmin, the U-phase fundamental voltage command value vu*=vu*0 is output. While no further explanation is provided, the fundamental limiter 9 also executes similar limit processing on the V-phase fundamental voltage command value vv*0 and the W-phase fundamental voltage command value vw*0 and outputs the V-phase fundamental voltage command value vv* and the W-phase fundamental voltage command value vw*.

If the differences between the inputs vu*0, vv*0 and vw*0 and the corresponding outputs vu*, vv* and vw* at the fundamental limiter 9 are not 0, the fundamental limiter overrun detector 11 judges that the input voltage command values vu*0, vv*0 and vw*0 are undergoing limit processing at the fundamental limiter 9 and, accordingly, sets integral gains at the PI-dq current controller 1 to 0. As a result, the integral control at the fundamental current control circuit is stopped so that the errors between the fundamental current command values id* and iq* and the actual current id and iq attributable to the output voltage limits are not continuously integrated in an unnecessary manner. Thus, the maximum performance in the fundamental current control is achieved within the upper and lower limits on the voltage output from the power converter 14. In addition, since the fundamental current control outputs are not allowed to become saturated due to the output voltage limits, the response of the fundamental current control system is improved.

The higher harmonic current control circuit includes a PI-dhqh current controller 7, a dhqh/3-phase converter 8, the 3-phase/dq converter 4 (shared with the fundamental current control circuit), a high pass filter (HPF) 5, a dq/dhqh converter 6, a higher harmonic limiter 10 and a higher harmonic limiter overrun detector 12. The PI-dhqh current controller 7 calculates a dh-axis higher harmonic voltage command value vdh* and a qh-axis higher harmonic voltage command value vqh* to be used to match actual currents idh and iqh with current command values idh* and iqh* respectively by implementing individual PI control on the deviations of the actual currents idh and iqh relative to the dh-axis current command value idh* and the qh-axis current command value iqh* calculated by a subtractor 24. It is to be noted that the higher harmonic current command values idh* and iqh* are normally 0.

The dhqh/3-phase converter 8 executes a coordinate transformation to convert a dh-axis voltage command value vdh* and the qh-axis voltage command value vqh* to 3-phase AC voltage command values (higher harmonic component) vu'0, vv'0 and vw'0 based upon a phase θeh of the higher harmonic current coordinate system (the dhqh-axis coordinate system) viewed from the 3-phase AC coordinate system. The high pass filter 5 extracts the higher harmonic component contained in the d-axis actual current id and the q-axis actual current iq. The dq/dhqh converter 6 performs a coordinate transformation to convert the d-axis higher harmonic current and the q-axis higher harmonic current to higher harmonic currents idh and iqh in the dhqh-axis coordinate system.

The higher harmonic limiter 10 performs limit processing on the 3-phase AC voltage command values vu'0, vv'0 and vw'0 so as to set the voltages output from the power converter 14 within the upper and lower limits determined in conformance to the level of the source voltage and the output limit. The 3-phase AC voltage command values (higher harmonic component) vu', vv' and vw' having undergone the limit processing are output to the power converter 14.

Figure 3:
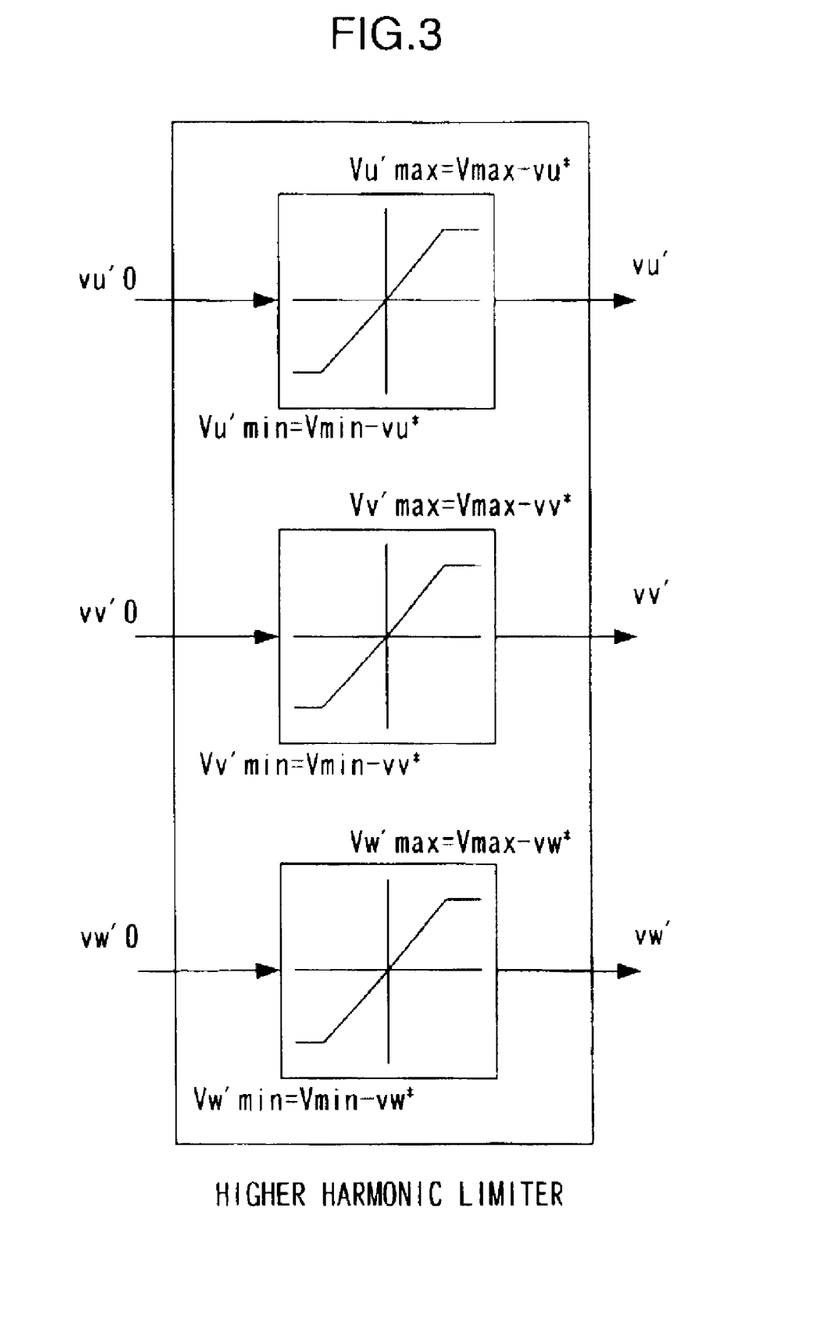
FIG. 3 shows the structure adopted in the higher harmonic limiter.

FIG. 3 shows the operation of the higher harmonic limiter 10. In order to give priority to the U-phase fundamental voltage command value vu* for the output, limits must be set for the 3-phase higher harmonic voltage command value vu' so that it is equal to or lower than a value Vu'max (=Vmax−vu*) obtained by subtracting the 3-phase fundamental voltage command value vu* from the upper limit value Vmax equivalent to the upper limit of the voltage output from the power converter 14 and equal to or higher than a value Vu'min (=Vmin−vu*) obtained by subtracting the 3-phase fundamental voltage command value vu* from the lower limit value Vmin equivalent to the lower limit of the voltage output from the power converter 14. Accordingly, if the U-phase higher harmonic voltage command value vu' exceeds the upper limit value Vu'max, the U-phase higher harmonic voltage command value vu'=Vu'max is output, and if the U-phase higher harmonic voltage command value vu' is lower than the lower limit value Vu'min, the U-phase higher harmonic voltage command value vu'=Vu'min is output. If the U-phase higher harmonic voltage command value vu' is equal to or lower than the upper limit value Vu'max and equal to or higher than lower limit value Vu'min*, the U-phase higher harmonic voltage command value vu'=vu'0 is output. While no further explanation is provided, the higher harmonic limiter 10 also executes similar limit processing on the V-phase higher harmonic command value vv'0 and the W-phase higher harmonic voltage command value vw'0 and outputs the V-phase higher harmonic voltage command value vv' and the W-phase higher harmonic voltage command value vw'.

If the differences between the inputs vu'0, vv'0 and vw'0 and the corresponding outputs vu', vv' and vw' at the higher harmonic limiter 10 are not 0, the higher harmonic limiter overrun detector 12 judges that the input voltage command values vu'0, vv'0 and vw'0 are undergoing limit processing at the higher harmonic limiter 10 and, accordingly, sets integral gains at the PI-dhqh current controller 7 to 0. As a result, the integral control at the higher harmonic current control circuit is stopped so that the errors between the higher harmonic current command values idh* and iqh* and the actual currents idh and iqh attributable to the output voltage limits are not continuously integrated in an unnecessary manner. Thus, the maximum performance in the higher harmonic current control is achieved within the upper and lower limits of the voltage output from the power converter 14. In addition, since the higher harmonic current control outputs are not allowed to become saturated due to the output voltage limits, the response of the higher harmonic current control system is improved.

An adder 23 adds the 3-phase fundamental voltage command values vu*, vv* and vw* output from the fundamental current control circuit with the 3-phase higher harmonic voltage command values vu', vv' and vw' output from the higher harmonic current control circuit and outputs the resulting sums to the power converter 14. The power converter 14 is an invertor which converts power from a DC source such as a battery (not shown) to AC power through a switching element such as an IGBT. The power converter 14 generates 3-phase AC voltages corresponding to the sums of the fundamental voltage command values vu*, vv* and vw* and the higher harmonic voltage command values vu', vv' and vw' and applies the voltages thus generated to the motor M. The motor M is a permanent magnet 3-phase synchronous motor.

The current sensor 15 detects the U-phase AC current iu and the V-phase AC current iv. It is to be noted that the W-phase AC current iw can be determined by using the U-phase AC current iu and V-phase AC current and iv, i.e., iw=−iu−iv. A pulse encoder PS, which is connected to the motor M, outputs a pulse signal corresponding to the rotation of the motor M. A phase speed calculator 16 calculates the rotating speed Ne of the motor M based upon the pulse signal provided by the pulse encoder PS and also calculates the phase θe of the fundamental current coordinate system (the dq-axis coordinate system) viewed from the 3-phase AC coordinate system and the phase θeh of the higher harmonic current coordinate system (the dhqh-axis coordinate system) viewed from the dq-axis coordinate system. For instance, θeh may be calculated as; θeh=k·θe when controlling the higher harmonic component of the kth degree contained in the d-axis current and the q-axis current in the dhqh-axis coordinate system.

As explained above, in the motor control apparatus in the first embodiment, the fundamental limiter 9 sets limits on the 3-phase fundamental voltage command values vu*, vv* and vw* calculated at the fundamental current control circuit so that they each fall within the range between the upper limit value Vmax and the lower limit value Vmin equivalent to the upper and lower limits of the voltage output from the power converter 14 and, as a result, it becomes possible to draw out the maximum performance from the fundamental current control circuit.

In addition, in the higher harmonic current control circuit, the higher harmonic limiter 10 sets the upper and lower limit values Vu'max, Vu'min, Vv'max, Vv'min, Vw'max and Vw'min obtained by subtracting the 3-phase fundamental voltage command values vu*, vv* and vw* from the upper and lower limit values Vmax and Vmin equivalent to the upper and lower limits of the voltage output from the power converter 14, and thus sets limits on the 3-phase higher harmonic voltage command values vu*, vv* and vw* calculated by the higher harmonic current control circuit so that they respectively fall within the ranges Vu'max~Vu'min, Vv'max~Vv'min and Vw'max~Vw'min. As a result, the 3-phase higher harmonic voltages are output, which are equivalent to the output voltage margins at the power converter 14 corresponding to the differences between the upper and lower limits on the voltages output from the power converter 14 and the 3-phase fundamental voltages, which makes it possible to draw out the maximum performance from the higher harmonic current control circuit within the range set by the upper and lower limits on the voltages output from the power converter 14.

As explained above, since specific limit values are set for the AC voltage command values for the current control outputs in correspondence to the individual components contained in the AC motor currents in the motor control apparatus that implements current control on each of the various components in the AC motor currents and calculates AC voltage command values corresponding to the individual components to be applied to the AC motor by executing, at least, integral control on the current deviations, limits can be set for the AC voltages to be applied to the AC motor for the individual components of the AC motor currents without inducing any interference. During this process, by implementing the current control individually for the fundamental component and the higher harmonic component contained in the 3-phase AC motor currents, limits can be imposed on the AC voltages applied to the 3-phase AC motor in correspondence to the fundamental components and the higher harmonic component in the 3-phase AC motor currents without inducing any interference.

In the motor control apparatus achieved in the first embodiment, if the 3-phase fundamental voltage command values vu*, vv* and vw* calculated by the fundamental current control circuit fall outside the range set by the upper and lower limit values Vmax and Vmin equivalent to the upper and lower limits on the voltages output from the power converter 14 and the limit processing by the fundamental limiter 9 is in progress, the integral control gains are set to 0 in the fundamental current control system to stop the integration of the fundamental current deviations (errors). As a result, saturation of the fundamental current control output attributable to the output voltage limits can be prevented to improve the response of the fundamental current control system. Likewise, if the 3-phase higher harmonic voltage command values vu', vv' and vw' calculated by the higher harmonic current control circuit fall outside the ranges set by the upper and lower limit values Vu'max and Vu'min, Vv'max and Vv'min and Vw'max and Vw'min equivalent to the upper and lower limits on the output voltage margins at the power converter 14 obtained by subtracting the 3-phase fundamental voltages from the upper and lower limits on the voltages output from the power converter 14 and the limit processing is in progress, the integral control gains are set to 0 in the higher harmonic current control system to stop the integration of the higher harmonic current deviations (errors). As a result, the saturation of the higher harmonic current control outputs attributable to the output voltage limits can be prevented to improve the response of the higher harmonic current control system.

Since the limit values are set at the fundamental limiter 9 in correspondence to the upper and lower limits on the voltages output from the power converter 14 and the values obtained by subtracting outputs from the fundamental limiter 9 from the limit values corresponding to the upper and lower limits on the voltages output from the power converter 14 are set for the limit values at the higher harmonic limiter 10, high current control performance is achieved by sequentially matching the actual currents with the corresponding current command values starting with the fundamental component contained in the 3-phase AC motor currents.

Furthermore, since the voltage command values at the fundamental current control circuit and the higher harmonic current control circuit are individually converted to voltage command values in the 3-phase AC coordinate system and the limit processing is executed on the 3-phase AC coordinate system, the output voltage limiters can simply be added into a motor control apparatus that controls a 3-phase AC motor by converting command values to values in the 3-phase AC coordinate system at the final stage of the control.

Second Embodiment

In the motor control apparatus achieved in the first embodiment, the integral gains used in the fundamental current control are set to 0 if 3-phase fundamental voltage command values output from the fundamental current control circuit fall outside the ranges set by the upper and lower limit values and the integral gains used in the higher harmonic current control are set to 0 if the 3-phase higher harmonic voltage command values output from the higher harmonic current control circuit fall outside the ranges set by the upper and lower limit values. In the motor control apparatus achieved in the second embodiment, on the other hand, if the 3-phase AC voltage command values fall outside ranges set by the upper and lower limit values in the fundamental current control circuit and the higher harmonic current control circuit, the fundamental current command values and the higher harmonic current command values are reduced in correspondence to the extents of the deviations.

Figure 4:
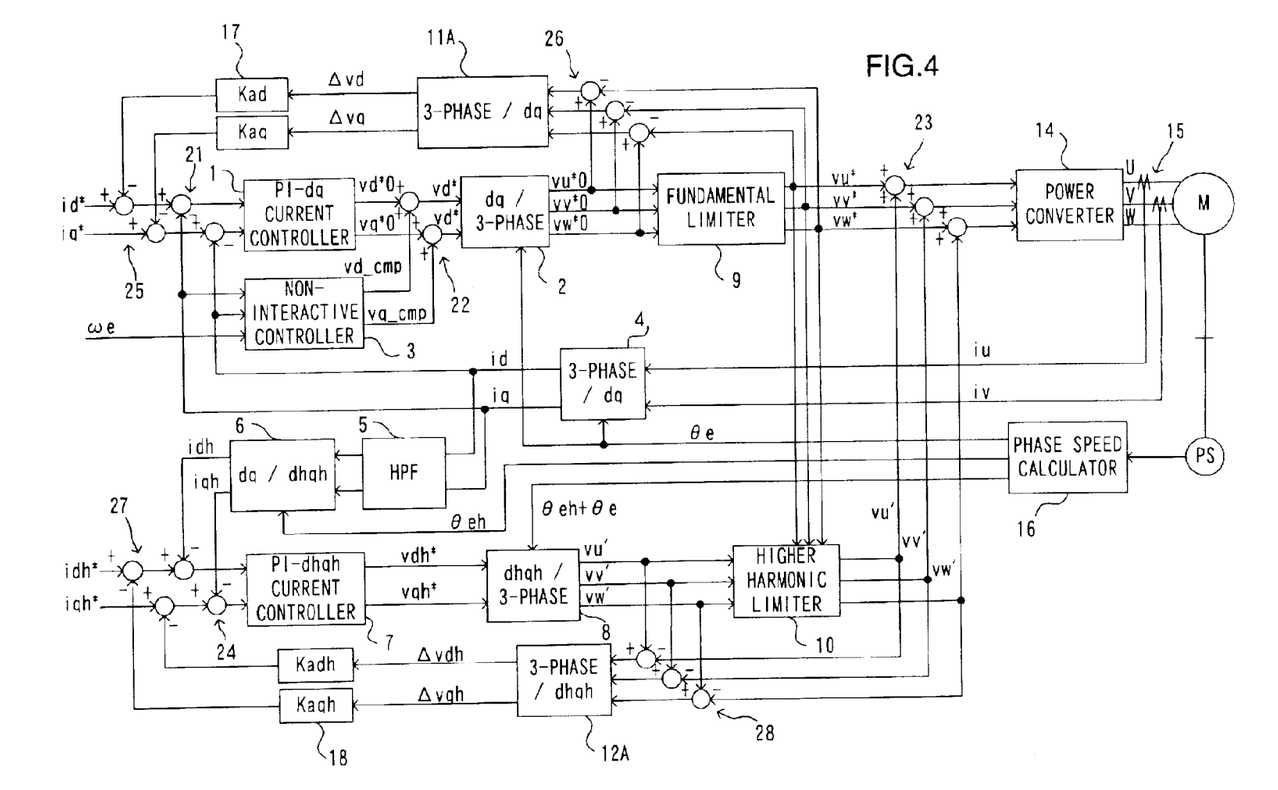
FIG. 4 shows the structure adopted in a second embodiment of the motor control apparatus according to the present invention.

FIG. 4 is a control block diagram showing the structure of the motor control apparatus achieved in the second embodiment. It is to be noted that the following explanation focuses on the difference from the structure shown in FIG. 1 by assigning the same reference numerals to components similar to those in FIG. 1.

In the fundamental current control circuit, a subtractor 26 subtracts the outputs vu*, vv* and vw* of the fundamental limiter 9 from the inputs vu*0, vv*0 and vw*0 at the fundamental limiter 9 and thus calculates the extents of the deviations of the 3-phase fundamental voltage command values vu*, vv* and vw* relative to the upper/lower limit values Vmax/Vmin. A 3-phase/dq converter 11A executes a coordinate transformation to convert the differences between the inputs and the outputs at the fundamental limiter 9, i.e., the deviations relative to the upper/lower limit values, to deviations in the dq-axis coordinate system and outputs the deviations $\Delta vd$ and $\Delta vq$ along the d-axis and the q-axis.

A multiplier 17 multiplies the d-axis deviation $\Delta vd$ and the q-axis deviation $\Delta vq$ respectively by gains Kad and Kaq. A subtractor 25 subtracts the deviations Kad·$\Delta vd$ and Kaq·66 vq respectively from the d-axis current command value id* and the q-axis current command value iq*. In other words, the d-axis current command value id* and the q-axis current command value iq* are reduced in correspondence to the extents of the deviations of the 3-phase AC voltage command values vu*, vv* and vw* relative to the upper and lower limit values Vmax and Vmin in the fundamental current control circuit. As a result, advantages similar to those realized in the motor control apparatus in the first embodiment are achieved. Namely, saturation of the fundamental current control outputs attributable to the output voltage limits can be prevented and thus, the response of the fundamental current control system can be improved.

Likewise, in the higher harmonic current control circuit, a subtractor 28 subtracts the outputs vu', vv' and vw' of the higher harmonic limiter 10 from the inputs vu'0, vv'0 and vw'0 at the higher harmonic limiter 10 and thus calculates the extents of the deviations of the 3-phase higher harmonic voltage command values vu', vv' and vw' relative to the upper/lower limit values Vu'max/Vu'min, Vv'max/Vv'min and Vw'max/Vw'min. A 3-phase/dhqh converter 12A executes a coordinate transformation to convert the differences between the inputs and the outputs at the higher harmonic limiter 10, i.e., the deviations relative to the upper/lower limit values, to deviations in the dhqh-axis coordinate system and outputs the deviations $\Delta vdh$ and $\Delta vqh$ along the dh-axis and the qh-axis.

A multiplier 18 multiplies the dh-axis deviation $\Delta vdh$ and the qh-axis deviation $\Delta vqh$ respectively by gains Kadh and Kaqh. A subtractor 27 subtracts deviations Kadh·$\Delta vdh$ and Kaqh·Δvqh respectively from the d-axis current command value idh* and the q-axis current command value iqh*. In other words, the dh-axis current command value idh* and the qh-axis current command value iqh* are reduced in correspondence to the extents of the deviations of the 3-phase AC voltage command values vu', vv' and vw' relative to the upper and lower limit values Vu'max/Vu'min, Vv'max/Vv'min and Vw'max/Vw'min in the higher harmonic current control circuit. As a result, advantages similar to those realized in the motor control apparatus in the first embodiment are achieved. Namely, saturation of the higher harmonic current control outputs attributable to the output voltage limits can be prevented and thus, the response of the higher harmonic current control system can be improved.

Third Embodiment

In the motor control apparatuses achieved in the first and second embodiments described above, the limit processing is implemented on the voltage command values in the 3-phase AC coordinate system. In the motor control apparatus achieved in the third embodiment, limit processing is implemented on the voltage command values in a 2-phase AC coordinate system (hereafter referred to as an αβ-axis coordinate system).

Figure 5:
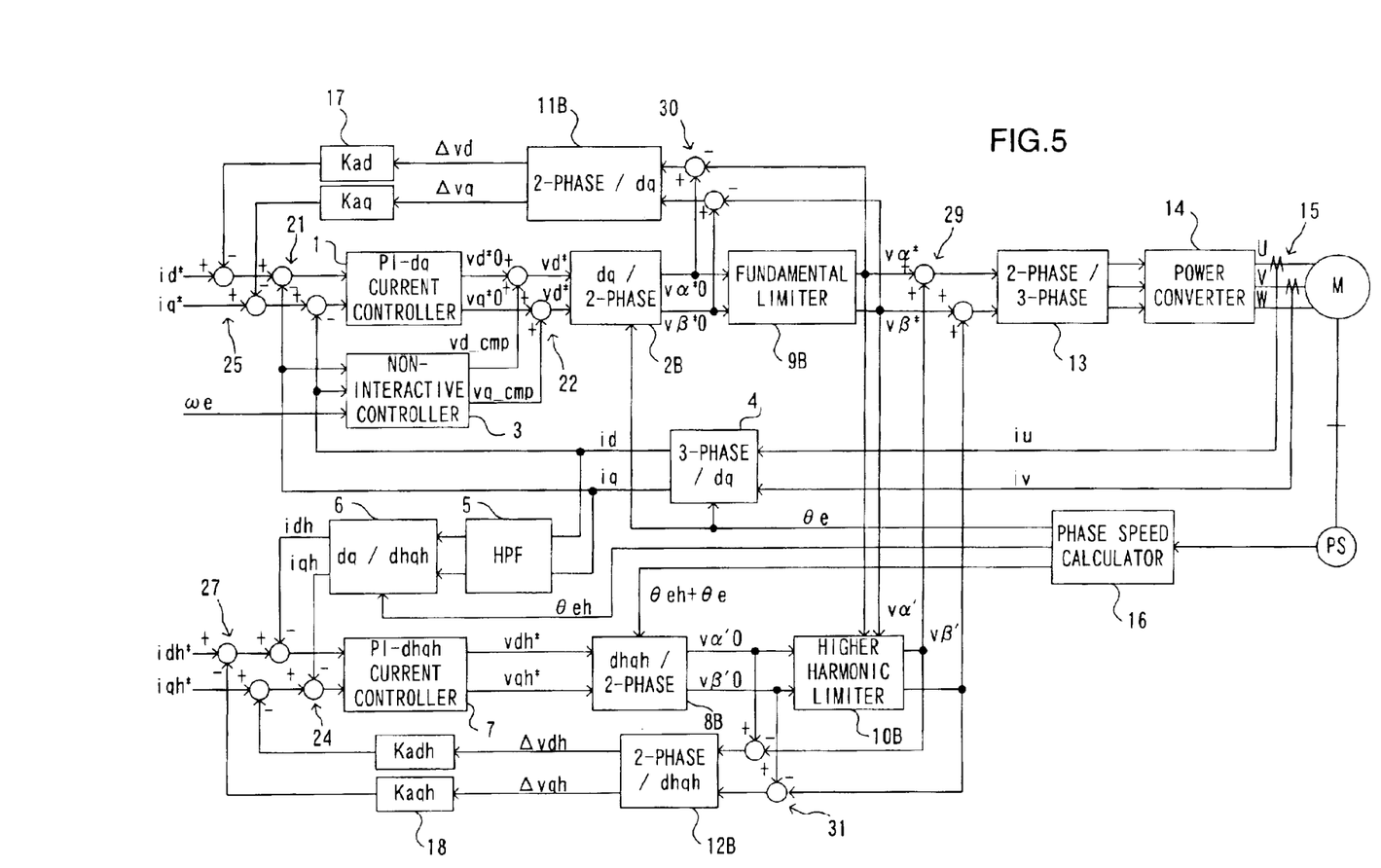
FIG. 5 shows the structure adopted in a third embodiment of the motor control apparatus according to the present invention.

FIG. 5 is a control block diagram showing the structure of the motor control apparatus achieved in the third embodiment. It is to be noted that the following explanation focuses on the differences from the structures shown in FIGS. 1 and 4 by assigning the same reference numerals to components similar to those in FIGS. 1 and 4.

In the fundamental current control circuit, a dq/2-phase converter 2B executes a coordinate transformation to respectively convert the d-axis voltage command value vd* and the q-axis voltage command value vq* to voltage command values vα*0 and vβ*0 in the αβ-axis coordinate system. A fundamental limiter 9B sets limits on the a-axis voltage command value vα*0 and the β-axis voltage command value vβ*0 based upon upper and lower limit values Vmax' and Vmin' and outputs an α-axis voltage command value vα* and a β-axis voltage command value vβ*. The upper and lower limit values Vmax' and Vmin' are limits set for the α-axis voltage command value and the β-axis voltage command value, which respectively correspond to the upper and the lower limits of the voltages output from the power converter 14.

A subtractor 30 subtracts the outputs vα* and vβ* from the fundamental limiter 9B respectively from the inputs vα*0 and vβ*0 at the fundamental limiter 9B to calculate the deviations of the 2-phase fundamental voltage command values vα* and vβ* relative to the upper/lower limit values Vmax'/Vmin'. A 2-phase/dq converter 11B executes a coordinate transformation to convert the differences between the inputs and the outputs at the fundamental limiter 9B in the αβ-axis coordinate system, i.e., the deviations relative to the upper/lower limit values, to deviations in the dq-axis coordinate system and outputs a d-axis deviation Δvd and a q-axis deviation Δvq.

The multiplier 17 multiplies the d-axis deviation Δvd and the q-axis deviation Δvq respectively by gains Kad and Kaq. The subtractor 25 subtracts the deviations Kad·Δvd and Kaq·Δvq respectively from the d-axis current command value id* and the q-axis current command value iq*. In other words, the d-axis current command value id* and the q-axis current command value iq* are reduced in correspondence to the extents of the deviations of the 2-phase AC voltage command values vα* and vβ* relative to the upper/lower limit values Vmax'/Vmin' in the fundamental control circuit. As a result, advantages similar to those realized in the motor control apparatuses in the first and second embodiments are achieved. Namely, saturation of the fundamental current control outputs attributable to the output voltage limits can be prevented and thus, the response of the fundamental current control system can be improved.

Likewise, in the higher harmonic current control circuit, a dhqh/2-phase converter 8B executes a coordinate transformation to convert the dh-axis voltage command value vdh* and qh-axis voltage command value vqh* to voltage command values vα'0 and vβ'0 in the αβ-axis coordinate system. A higher harmonic limiter 10B sets limits on the α-axis voltage command value vα'0 and the β-voltage command value vβ'0 based upon upper and lower limit values Vα'max', Vβ'min', Vβ'max' and Vβ'min' and outputs an α-axis voltage command value vα' and a β-axis voltage command value vβ'. The upper and lower limit values Vα'max, Vα'min, Vβ'max and Vβ'min which are each set so that the α-axis fundamental voltage command value vα* and the β-axis voltage command value vβ* are given priority for the output, are set to; Vα'max=Vmax'−vα*, Vα'min=Vmin'−vα*, Vβ'max=Vmax'−vβ* and Vβ'min=Vmin'−vβ*.

A subtractor 31 subtracts the outputs Vα' and Vβ' of the higher harmonic limiter 10B from the inputs Vα'0 and Vβ'0 at the higher harmonic limiter 10B and thus calculates the extents of the deviation of the 2-phase higher harmonic voltage command values Vα' and Vβ' relative to the upper/lower limit values Vα'max/Vα'min and Vβ'max/Vβ'min. A 2-phase/dhqh converter 12B executes a coordinate transformation to convert the differences between the inputs and the outputs at the higher harmonic limiter 10B, i.e., the deviations relative to the upper/lower limit values, to deviations in the dhqh-axis coordinate system and outputs the deviations Δvdh and Δvqh along the dh axis and the qh axis.

The multiplier 18 multiplies the dh-axis deviation Δvdh and the qh-axis deviation Δvqh respectively by gains Kadh and Kaqh. The subtractor 27 subtracts the deviations Kadh·Δvdh and Kaqh·Δvqh respectively from the d-axis current command value idh* and the q-axis current command value iqh*. In other words, the dh-axis current command value idh* and the qh-axis current command value iqh* are reduced in correspondence to the extents of the deviations of the 2-phase AC voltage command values Vα' and vβ' relative to the upper/lower limit values Vα'max/Vα'min and Vβ'max/Vβ'min in the higher harmonic current control circuit. As a result, advantages similar to those realized in the motor control apparatuses in the first and second embodiments are achieved. Namely, saturation of the higher harmonic current control outputs attributable to the output voltage limits can be prevented and thus, the response of the higher harmonic current control system can be improved.

An adder 29 adds the α-axis voltage command value vα' and the β-axis voltage command value vβ' calculated at the higher harmonic current control circuit respectively to the α-axis voltage command value vα* and the β-axis voltage command value vβ* calculated at the fundamental current control circuit. A 2-phase/3-phase converter 13 converts the sums obtained at the adder 29 to 3-phase AC voltage command values and outputs the conversion results to the power converter 14.

Through the motor control achieved in the third embodiment, the voltage command values obtained at the fundamental current control circuit and the higher harmonic current control circuit are individually converted to voltage command values in the 2-phase AC coordinate system (the αβ-axis coordinate system) and the limit processing is implemented on the 2-phase AC coordinate system. As a result, the volume of the arithmetic operation that must be performed can be reduced compared to that required for limit processing executed on the 3-phase AC coordinate system, which makes it possible to reduce the load on the microcomputer.

The above described embodiments are examples, and various modifications can be made without departing from the spirit and scope of the invention. For instance, while the limit processing is implemented on the voltage command values in the 3-phase AC coordinate system and the $\alpha\beta$-axis coordinate system by utilizing the fundamental limiter and the higher harmonic limiter in the motor control apparatuses in the first through third embodiments, limit processing may be implemented on voltage command values in the dq-axis coordinate system, instead. Alternatively, the fundamental limit processing may be implemented on the voltage command values in the dq-axis coordinate system and the higher harmonic limit processing may be implemented on the voltage command values in the dhqh-axis coordinate system, as well.

In addition, while the present invention has been explained in reference to an example in which the control is implemented on a permanent magnet 3-phase synchronous motor, the present invention may instead be adopted in conjunction with a 3-phase induction motor.

Furthermore, while the invention has been explained in reference to examples in which the motor control apparatus includes a fundamental current control circuit that controls the fundamental component of currents flowing into a 3-phase AC motor and a higher harmonic current control circuit that controls a higher harmonic component of a predetermined order contained in the motor currents, the present invention may also be adopted in a motor control apparatus having a plurality of higher harmonic current control circuits for controlling higher harmonic components of a plurality of degrees contained in the motor currents in addition to the fundamental current control circuit.

Namely, a plurality of current control circuits that calculate AC voltage command values corresponding to various components to be applied to an AC motor by detecting a plurality of components different from one another that are contained in the AC motor currents and by individually implementing at least integral control on the deviations of the detected current values corresponding to the individual components relative to the current command values for the components of the AC motor currents may be provided in the motor control apparatus. In such a case, a plurality of voltage limiters should be provided to set specific limits on the voltage command values obtained in the individual current control circuits at specific limit values should be provided so that voltages corresponding to the sums of the outputs from the plurality of voltage limiters are applied to the AC motor by a power converter.

In this structure, the individual components in the AC motor currents should be assigned with priority rankings and the limit values corresponding to the upper and lower limits of the voltages output from the power converter should be set as the limit values for the component with the highest priority ranking. In addition, the limit values for a component other than the component with the highest priority ranking should be values obtained by subtracting all the outputs of the voltage limiters 4 corresponding to the components with higher priority rankings than the component from the limit values equivalent to the upper and lower limits of the voltages output from the power converter. Then, if the voltage limiter of a given current control circuit is currently imposing limits on the voltage command values of the current control circuit by using the limit values, the integral control in the current control circuit is stopped. By assuming the structure, it becomes possible to realize a high level of current control performance by sequentially matching the actual currents with the current command values starting with the component with the highest priority ranking among various components contained in the AC motor currents. It is to be noted that when the voltage limiter of a given current control circuit is currently imposing limits on the voltage command values of the current control circuit by using the limited values, the current command values may be reduced in conformance to the extents of the deviations of the voltage command values at the current control circuit relative to the limit values.

While an explanation has been given in reference to the embodiments in which the fundamental current control circuit and the higher harmonic current control circuit implement proportional integral control (PI control) on current deviations, current control circuits that implement proportional•integral•differential control (PID control) on current deviations may be utilized instead.

The disclosure of the following priority application is herein incorporated by reference:
Japanese Patent Application No. 2001-350156 filed Nov. 15, 2001.

What is claimed is:

1. A motor control apparatus comprising:
   a current component detection device that detects a plurality of components contained in an AC motor current which are different from one another;
   a plurality of current control devices each provided in correspondence to one of the components in the AC motor current to implement at least integral control on a deviation of a detected current value corresponding to the component detected by the current component detection device relative to a current command value corresponding to the component and to calculate a command value for an AC voltage corresponding to the component to be applied to the AC motor;
   a plurality of voltage limit devices each provided in correspondence to one of the current control devices to limit the voltage command value calculated by the corresponding current control device to each of predetermined limit values; and
   a power conversion device that calculates a sum of outputs from the plurality of voltage limit devices and applies a voltage corresponding to the sum to the AC motor.

2. A motor control apparatus according to claim 1, wherein:
   the individual components in an AC motor current are assigned with priority rankings, the limit values for the voltage limit device corresponding to a component with a highest priority ranking are set to values corresponding to an upper limit and a lower limit of an output voltage from the power conversion device, and the limit values for a voltage limit device corresponding to a component other than the component with the highest priority ranking are set to values obtained by subtracting outputs of all the voltage limit devices corresponding to components with higher priority rankings than the component from the limit values corresponding to the upper limit and the lower limit of the voltage output from the power conversion device.

3. A motor control apparatus according to claim 2, wherein:

the current control devices each stop the integral control if the corresponding voltage command value is being limited by the voltage limit device to each of the limit values.

4. A motor control apparatus according to claim 2, wherein:

the current control devices each reduce the current command value in correspondence to a value representing a deviation of the voltage command value relative to each of the limit values if the corresponding voltage command value is being limited by the voltage limit device to each of the limit values.

5. A motor control apparatus, comprising:

a current detector that detects a fundamental component and a higher harmonic component contained in a 3-phase AC motor current;

a fundamental current control circuit that controls the fundamental component in the 3-phase AC motor current in a dq-axis coordinate system rotating in synchronization with the rotation of the 3-phase AC motor, the fundamental current control circuit calculating a command value for a fundamental voltage to be applied to the 3-phase AC motor by implementing at least integral control on a deviation of a detected current value corresponding to the fundamental component detected by the current detector relative to a current command value corresponding to the fundamental component;

a higher harmonic current control circuit that controls the higher harmonic component in the 3-phase AC motor current in an orthogonal coordinate system (hereafter referred to as a higher harmonic coordinate system) rotating at a frequency set to an integral multiple of a frequency of the fundamental component in the 3-phase AC motor current, the higher harmonic current control circuit calculating a command value for a higher harmonic voltage to be applied to the 3-phase AC motor by implementing at least integral control on a deviation of a detected current value corresponding to the higher harmonic component detected by the current detector relative to a current command value corresponding to the higher harmonic component;

a fundamental voltage limiter that limits the fundamental voltage command value calculated by the fundamental current control circuit to each of predetermined limit values;

a higher harmonic voltage limiter that limits the higher harmonic voltage command value calculated by the higher harmonic current control circuit to each of predetermined limit values; and a power converter that calculates a sum of the outputs from the fundamental voltage limiter and the higher harmonic voltage limiter and applies a voltage corresponding to the sum to the AC motor.

6. A motor control apparatus according to claim 5, wherein:

the limit values at the fundamental voltage limiter are set to values corresponding to upper and lower limits of an output voltage of the power converter and the limit values at the higher harmonic voltage limiter are set to values obtained by subtracting the output of the fundamental voltage limiter from the limit values corresponding to the upper and lower limits of the voltage output from the power converter.

7. A motor control apparatus according to claim 6, wherein:

the fundamental current control circuit stops the integral control while the fundamental voltage command value is being limited by the fundamental voltage limiter to each of the limit values, and the higher harmonic current control circuit stops the integral control while the higher harmonic voltage command value is being limited by the higher harmonic voltage limiter to each of the limit values.

8. A motor control apparatus according to claim 7, wherein:

the fundamental current control circuit and the higher harmonic current control circuit stop the integral control by setting an integral control gain to 0.

9. A motor control apparatus according to claim 6, wherein:

the fundamental current control circuit reduces the fundamental current command value in correspondence to a value representing a deviation of the fundamental voltage command value relative to the limit values if the fundamental voltage command value is being limited by the fundamental voltage limiter to each of the limit values; and the higher harmonic current control circuit reduces the higher harmonic current command value in conformance to a value representing the deviation of the higher harmonic voltage command value relative to the limit values while the higher harmonic voltage command value is being limited by the higher harmonic voltage limiter to each of the limit values.

10. A motor control apparatus according to claim 5, wherein:

the fundamental voltage limiter and the higher harmonic voltage limiter respectively convert the voltage command value obtained at the fundamental current control circuit and the voltage command value obtained at the higher harmonic current control circuit to voltage command values in a 3-phase AC coordinate system and implement limit processing on the 3-phase AC coordinate system.

11. A motor control apparatus according to claim 5, wherein:

the fundamental voltage limiter and the higher harmonic voltage limiter respectively convert the voltage command value obtained at the fundamental current control circuit and the voltage command value obtained at the higher harmonic current control circuit to voltage command values in a 2-phase AC coordinate system (an $\alpha\beta$-axis coordinate system) and implement limit processing on the 2-phase AC coordinate system.

12. A motor control apparatus comprising:

a current component detection means for detecting a plurality of components contained in an AC motor current which are different from one another;

a plurality of current control means for implementing at least integral control on a deviation of a detected current value corresponding to the component detected by the current component detection means relative to a current command value corresponding to the component and calculating a command value for an AC voltage corresponding to the component to be applied to the AC motor, each of the current control means being provided in correspondence to one of the components in the AC motor current;

a plurality of voltage limiting means for limiting the voltage command value calculated by the corresponding current control means to each of predetermined limit values, each of the voltage limiting means being provided in correspondence to one of the current control means; and a power conversion means for calculating a sum of outputs from the plurality of voltage limiting means and applies a voltage corresponding to the sum to the AC motor.

13. A motor control method comprising:

detecting a plurality of components contained in an AC motor current that are different from one another;

calculating AC voltage command values each corresponding to one of the components to be applied to the AC motor by implementing at least integral control on a deviation of a detected current value corresponding to the component relative to a current command value corresponding to the component;

limiting the voltage command values each calculated in correspondence to one of the components to each of predetermined limit values; and applying a voltage corresponding to a value representing a sum of the voltage command values having undergone limit processing to the AC motor.

* * * * *